United States Patent Office 2,726,233
Patented Dec. 6, 1955

2,726,233

PURIFICATION OF HYDROGENATED POLYSTYRENE

Arthur J. Warner, Glen Ridge, and Donald K. Keel, Cranford, N. J., assignors to International Telephone and Telegraph Corporation, a corporation of Maryland No Drawing. Application April 8, 1953,
Serial No. 347,610

10 Claims. (Cl. 260—93.5)

This invention relates to novel methods for treating hydrogenated polystyrene and is more particularly directed to novel methods for purifying hydrogenated polystyrene.

One of the starting materials that may be employed in the preparation of monomeric styrene is ethylbenzene. After the monomeric styrene is produced it may be polymerized to provide solid polymers thereof. This polymerized styrene, or polystyrene, may be treated with hydrogen and converted to hydrogenated polystyrene, also known as polyvinylcyclohexane. It is known that the conversion of polystyrene to hydrogenated polystyrene is not completed, using known techniques. Therefore, various quantities of polystyrene are found as contaminants of the hydrogenated polystyrene. The close similarity in chemical properties between polystyrene and hydrogenated polystyrene has rendered the separation of the polystyrene from the hydrogenated polystyrene, and the consequent purification of the hydrogenated polystyrene thereby, a difficult problem. The presence of the polystyrene contaminant in hydrogenated polystyrene serves to impair an important property of the hydrogenated polystyrene, namely, its superior resistance, as compared with polystyrene and other materials, to the effects of ionizing radiation when used as an insulant in ionization chambers and dosimeters. The heat-distortion temperature of hydrogenated polystyrene is also adversely affected, it being lowered by the presence of the polystyrene contaminant.

Because of the foregoing a considerable need has existed for a simple, convenient, rapid, and economically practical method for purifying hydrogenated polystyrene by removing the contaminating polystyrene. It is an object of the present invention, therefore, to indicate a simple and convenient method for purifying hydrogenated polystyrene. It is a further object to provide a method for separating polystyrene from hydrogenated polystyrene which can be used conveniently at room temperature. Other objects of this invention will become apparent from the following description.

According to this invention, hydrogenated polystyrene is purified by separating it from polystyrene. This is accomplished by utilizing the similarities and differences of polystyrene and hydrogenated polystyrene with respect to their solubility in various organic solvents, particularly in carbocyclic hydrocarbon solvents and in cyclic ethers. Thus, polystyrene has been found to be completely soluble at room temperature in the following carbocyclic hydrocarbon solvents: benzene, toluene, methylcyclohexane, and decahydronaphthalene; and in the following inner or cyclic ethers: ethylene oxide, propylene oxide, butylene oxide, and dioxane. Hydrogenated polystyrene, in contrast, while dissolving readily to produce a clear solution in any of the above enumerated carbocyclic hydrocarbon solvents, namely, benzene, toluene, methylcyclohexane, and decahydronaphthalene, is precipitated at room temperature by any of the above enumerated cyclic ethers, namely, ethylene oxide, propylene oxide, butylene oxide, and dioxane. By propylene oxide we refer to the compound known more specifically as 1,2-epoxypropane. By butylene oxide we refer to the compound known more specifically as 1,2-epoxybutane. By dioxane we specifically designate that isomer known as 1,4-dioxane.

As an example of the use of this method, we dissolve polystyrene of molecular weight 40,000, although molecular weights from 10,000 to 150,000 may equally well be used, in a solvent such as decahydronaphthalene to form a solution containing from about 2 to 12% polystyrene by weight. Methylcyclohexane or a similar solvent such as benzene or toluene may be used in place of the decahydronaphthalene. We prefer to use the latter, however. This solution is loaded into a conventional type hydrogenation bomb equipped with a shaking arm. We have found that the selection of the catalyst used to promote the hydrogenation of the polystyrene is fairly critical. Thus, attempts to hydrogenate polystyrene at low pressures in the presence of such well-known catalysts as platinum oxide or Raney nickel have not been too successful. However, we have found that a reduced nickel prepared from nickel oxalate will function as a satisfactory catalyst. Into this bomb we then load 250 milliliters of a solution of decahydronaphthalene containing 10 grams of polystyrene, this solution being combined with 30 grams of the reduced nickel catalyst. The hydrogen pressure used is usually not permitted to exceed 2,000 pounds per square inch at a temperature not in excess of 200° C. For example, a temperature between 130–160° C. is suitable.

As an example of a specific run, after transferring the catalyst and polystyrene solution previously described into the glass liner of the bomb, sealing the latter and assembling it in the rocker, the contents of the bomb were purged with hydrogen, and the bomb was brought to an initial hydrogen pressure of 990 pounds per square inch (p. s. i.) gage at room temperature. Rocking and heating were started, and the pressure mounted to 1360 p. s. i. at 160° C. and dropped to 1050 p. s. i. at 200° C. in 35 minutes. The reaction was allowed to proceed for four hours from the time heating began. The time of reaction may be varied between two and six hours depending upon the other variables of temperature, pressure, and concentration of reactants. The reaction product was a black, viscous liquid which was filtered twice through a diatomaceous earth to remove the catalyst. The water-clear liquid product was then poured into from one-half to one volume of methanol and stirred. Methanol serves to precipitate the polymer consisting of polystyrene and hydrogenated polystyrene. Any monomeric styrene or other methanol-soluble material remains in solution. The precipitate was filtered, washed with methanol, and dissolved at room temperature in methylcyclohexane to form an approximately 10% solution by weight. In place of the methylcyclohexane, one may also use benzene, toluene, or decahydronaphthalene. To this solution was added an equal volume of propylene oxide and the entire mixture was vigorously stirred. Instead of the propylene oxide, one may also use ethylene oxide, butylene oxide, or dioxane. The hydrogenated polystyrene present was precipitated by the propylene oxide, whereas the polystyrene present remained in solution. The hydrogenated polystyrene was filtered off, washed with propylene oxide and vacuum-dried. For further purification it may be redissolved in methylcyclohexane and reprecipitated therefrom by propylene oxide, although we have found that this is not essential in order to obtain a product of reasonably high purity.

As can be seen from the foregoing example, the method of purification of hydrogenated polystyrene requires small quantities of solvents which can be used in a convenientsize apparatus; furthermore, these solvents can be readily and conveniently fully recovered. The polystyrene and hydrogenated polystyrene are precipitated in the methanol solution as clear flocculent precipitates which rapidly settle leaving a clear supernatant liquid; and precipitation from a carbocyclic hydrocarbon solvent, such as methylcyclohexane, by a cyclic ether solvent, such as propylene oxide, also results in a precipitate of hydrogenated polystyrene which is flocculent, rapidly settles, and is easily filtered and conveniently dried. The drying is particularly convenient, thereby leading to a complete purification of the hydrogenated polystyrene, because of the low boiling points of the cyclic ethers, particularly of the alkylene oxides. Examination of the absorption spectrum of the purified hydrogenated polystyrene using an infrared spectrometer showed an almost complete absence of the large absorption peak observed for polystyrene in the infrared region, this peak occurring at a wavelength of approximately eleven microns. This indicates an extremely high degree of hydrogenation of the sample and a corresponding absence of polystyrene.

While we have described above the principles of our invention in connection with specific methods steps, it is to be clearly understood that this description is made only by way of example and not as a limitation to the scope of our invention as set forth in the objects thereof and in the accompanying claims.

We claim:

1. A method for purifying hydrogenated polystyrene comprising dissolving a mixture of polystyrene and hydrogenated polystyrene in a carbocyclic hydrocarbon solvent selected from the group consisting of benzene, toluene, methylcyclohexane, and decahydronaphthalene to form a solution, and to said solution adding a quantity of a cyclic ether selected from the group consisting of ethylene oxide, propylene oxide, butylene oxide, and dioxane to precipitate the hydrogenated polystyrene therefrom.

2. A method as in claim 1 wherein the molecular weight of said hydrogenated polystyrene is between 10,000 and 150,000.

3. A method for purifying hydrogenated polystyrene comprising dissolving a mixture of polystyrene and hydrogenated polystyrene in methylcyclohexane to form a solution, and to said solution adding a quantity of propylene oxide to precipitate the hydrogenated polystyrene therefrom.

4. A method as in claim 3 wherein the molecular weight of said hydrogenated polystyrene is between 10,000 and 150,000.

5. A method for purifying a reaction product of polystyrene and hydrogen comprising dissolving a reaction product of polystyrene and hydrogen in a carbocyclic hydrocarbon solvent selected from the group consisting of benzene, toluene, methylcyclohexane, and decahydronaphthalene to form a solution, and to said solution adding a quantity of a cyclic ether selected from the group consisting of ethylene oxide, propylene oxide, butylene oxide, and dioxane to precipitate hydrogenated polystyrene therefrom.

6. A method for purifying a reaction product of polystyrene and hydrogen comprising dissolving a reaction product of polystyrene and hydrogen in methylcyclohexane to form a solution, and to said solution adding a quantity of propylene oxide to precipitate hydrogenated polystyrene therefrom.

7. A method for purifying hydrogenated polystyrene comprising adding methanol to a liquid polymeric mixture comprising polystyrene and hydrogenated polystyrene, dissolving the solid precipitate formed in said methanol solution in a carbocyclic hydrocarbon solvent selected from the group consisting of benzene, toluene, methylcyclohexane, and decahydronaphthalene to form a solution, and to said solution adding a quantity of a cyclic ether selected from the group consisting of ethylene oxide, propylene oxide, butylene oxide, and dioxane to precipitate the hydrogenated polystyrene therefrom.

8. A method as in claim 7 wherein the molecular weight of the hydrogenated polystyrene is between 10,000 and 150,000.

9. A method for purifying hydrogenated polystyrene comprising adding methanol to a liquid polymeric mixture comprising polystyrene and hydrogenated polystyrene, dissolving the solid precipitate formed in said methanol solution in methylcyclohexane to form a solution, and to said methylcyclohexane solution adding a quantity of propylene oxide to precipitate the hydrogenated polystyrene therefrom.

10. A method as in claim 9 wherein the molecular weight of the hydrogenated polystyrene is between 10,000 and 150,000.

References Cited in the file of this patent

UNITED STATES PATENTS

| | | |
|---|---|---|
| 2,270,184 | Dreisbach | Jan. 13, 1942 |
| 2,394,761 | Ford | Feb. 12, 1946 |